CENTER-WEIGHTED FLOATING ROOF

Original Filed Dec. 24, 1948 6 Sheets-Sheet 1

INVENTORS:
Frank D. Prager
Reign C. Ulm
BY:
F. D. Prager
Atty.

CENTER-WEIGHTED FLOATING ROOF

Original Filed Dec. 24, 1948 6 Sheets-Sheet 2

INVENTORS:
Frank D. Prager
Reign C. Ulm
BY:
F. D. Prager Atty.

CENTER-WEIGHTED FLOATING ROOF

Original Filed Dec. 24, 1948 6 Sheets-Sheet 3

INVENTORS:
Frank D. Prager
Reign C. Ulm
BY:
F. D. Prager
Atty.

CENTER-WEIGHTED FLOATING ROOF

Original Filed Dec. 24, 1948 6 Sheets-Sheet 4

INVENTORS:
Frank D. Prager
Reign C. Ulm
BY:
F. D. Prager
Atty.

CENTER-WEIGHTED FLOATING ROOF

Original Filed Dec. 24, 1948

INVENTORS:
Frank D. Prager
Reign C. Ulm
BY: F. D. Prager
atty.

CENTER-WEIGHTED FLOATING ROOF

Original Filed Dec. 24, 1948 6 Sheets-Sheet 6

INVENTORS:
Frank D. Prager
Reign C. Ulm
BY:
F. D. Prager
Atty.

Reissued Oct. 16, 1951

Re. 23,417

UNITED STATES PATENT OFFICE 23,417

CENTER-WEIGHTED FLOATING ROOF

Frank D. Prager, Chicago, Ill., and Reign C. Ulm, Schererville, Ind., assignors to Graver Tank & Mfg. Co., Inc., a corporation of Delaware Original No. 2,497,047, dated February 7, 1950, Serial No. 67,187, December 24, 1948. Application for reissue January 24, 1951, Serial No. 207,458

5 Claims. (Cl. 220—26)

Matter enclosed in heavy brackets [ ] appears in the original patent but forms no part of this reissue specification; matter printed in italics indicates the additions made by reissue.

This invention relates to floating roofs of the single-deck type, for large storage tanks for gasoline and other liquids.

Our invention adds to the useful service life of such a roof, while reducing the cost of maintenance and either reducing or at least not increasing the cost of construction. These advantages are obtained with a very slight sacrifice; the storage capacity of the tank is reduced by a minute and practically insignificant amount.

The advantages of our invention are particularly outspoken when the roof is used for the protection of sour crudes. This type of product releases vapors and gases which are highly corrosive. If such vapors and gases accumulate under the roof, the savings derived from the retention and partial condensation of the vapors are soon outweighed by the loss due to their corrosive attack. Sour crudes are stored in tremendous quantities; this storage problem furnishes one of the main applications of our invention.

A principal feature of our invention is that it prevents both large and small accumulations of water on the roof and of vapor and gas under the roof, while eliminating the bothersome obstructions and dangerous features of earlier types of floating roofs of the single-deck type.

This feature is provided by most economical means, consisting principally of a simple, central ballast weight, consisting also of relatively inexpensive reinforcements to absorb the stresses set up by this weight, and involving the elimination of relatively expensive and inefficient elements previously used.

We provide a certain amount of sand or other ballast material, bearing a certain relationship in weight to the total weight of the roof and its reinforcements. We preferably form this ballast into a shape characterized by certain proportions with regard to its own dimensions and those of the roof. We install it permanently in the central part of a flexible single-deck floating roof. We thereby enforce complete and uniform central drainage of water from the top of the roof and complete and uniform peripheral removal of vapor and gas from under the roof, without local bulges or depressions. Our arrangement is such that this drainage and removal of undesirable materials takes place in all operative conditions of the roof, including those prevailing at high and low temperatures, during heavy rainstorms, and in other contingencies; moreover it is such as to simplify the support of the roof during maintenance operations that may be required on the roof itself or on the tank.

These features, advantages and objects of our invention will be more clearly understood upon consideration of the detailed description which follows and of the drawings annexed.

In the drawings, Figure 1 is a cross-sectional elevation of a preferred embodiment of our invention. Figures 2 and 3 are modifications of this embodiment, and Figure 4 is a plan view of the apparatus of Figure 1.

Figures 5 and 6 are respectively, plan view and sectional elevation of the central ballast weight, on an enlarged scale. The section in Figure 6 is along lines 6—6 of Figure 5. The two views show the central ballast weight of Figures 1 and 4 in greater detail but still in its entirety. The body of the roof appears in the elevation of Figures 1 and 6 as a single, straight, horizontal line. Actually we provide a small but definite slope, having a certain contour, in the body of the roof. That this slope is invisible in the elevations of Figures 1 and 6 is due to the large diameter of the typical roof shown, and the relative smallness of the slope. This slope is important for our invention, but other figures must be used to disclose the details.

Figure 7 shows an outer part of the central ballast weight in sectional elevation, along lines 7—7 of Figure 5. This part is shown in greater enlargement. The room available in this figure is still insufficient to show the slope of the roof, but the enlargement is sufficient to show the relative thicknesses of some of the plate materials used, a feature of some importance.

Figure 1:
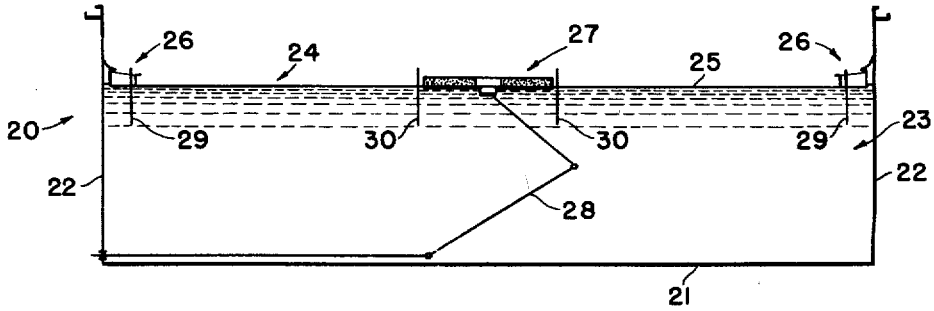
Figure 9:
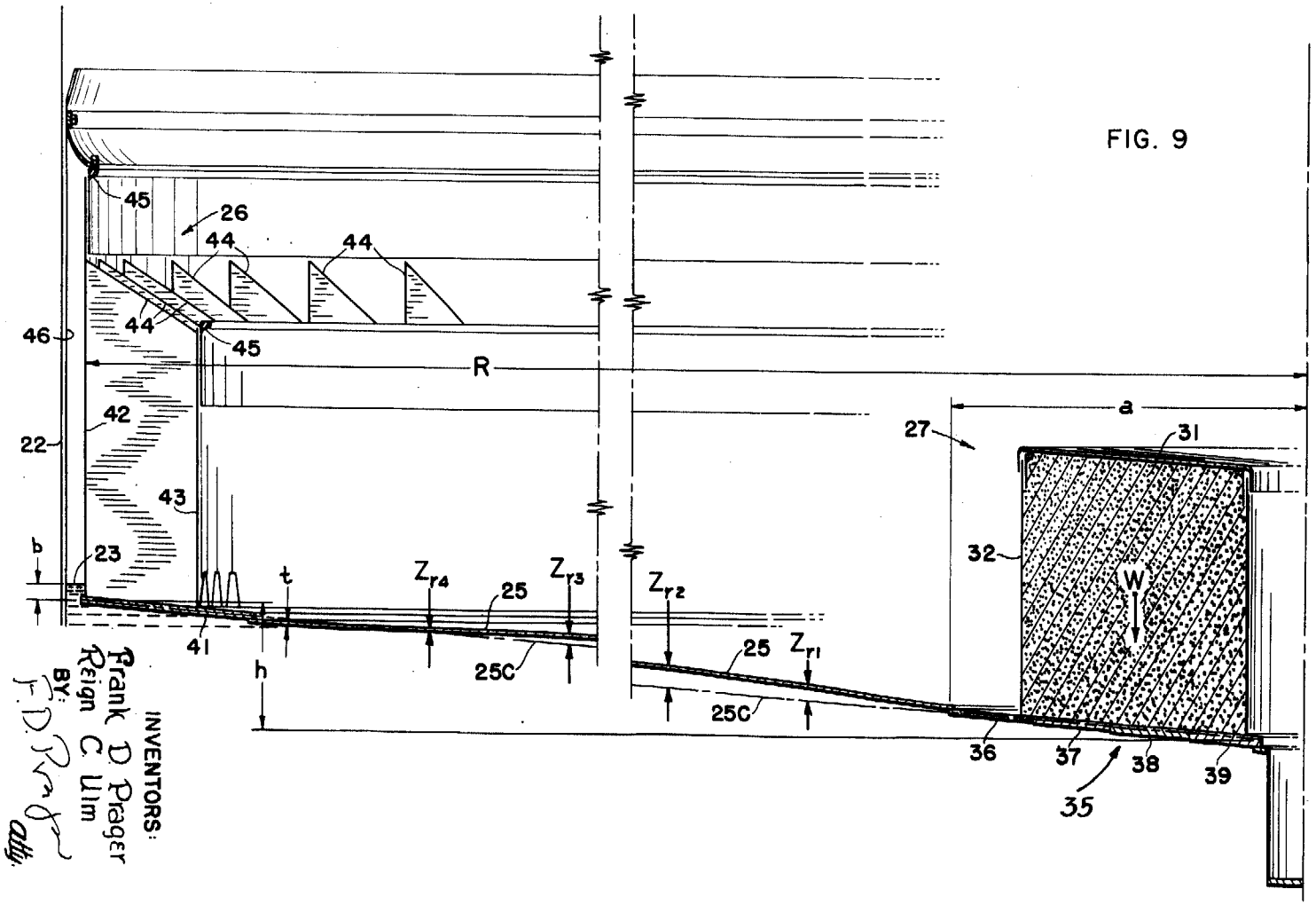
Figure 9 is a diagrammatic, sectional elevation of the parts shown in Figures 7 and 8, combined and contrasted with one another in order to disclose vertical dimensions and positions of certain parts. All vertical dimensions are emphasized in this figure by increasing them several times over the horizontal dimensions.
Figure 10:
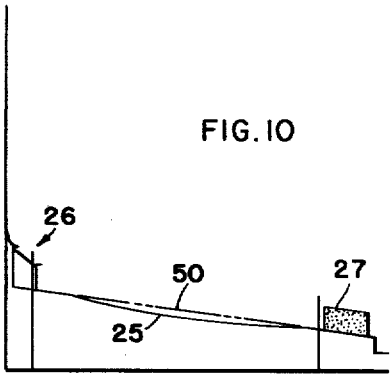
Figure 13:
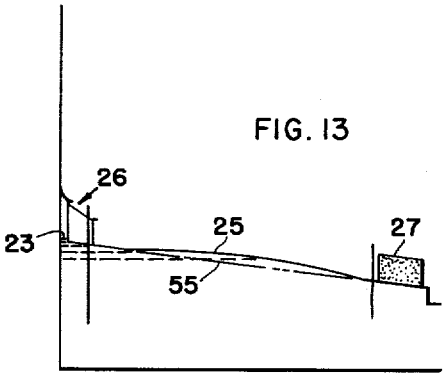
Figure 11:
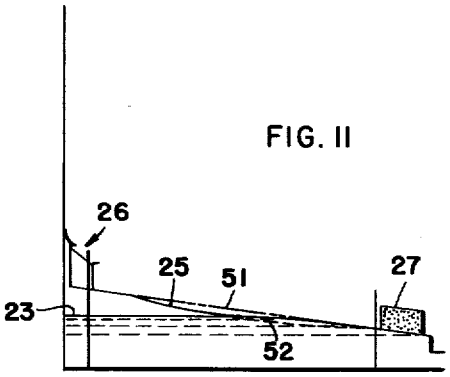
Figure 14:
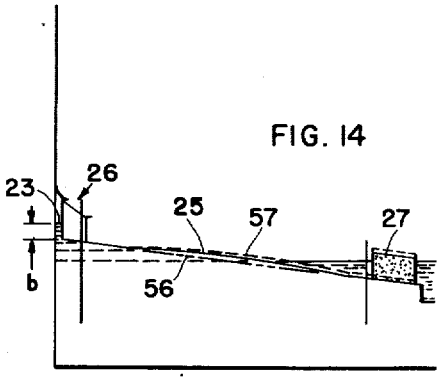
Figure 12:
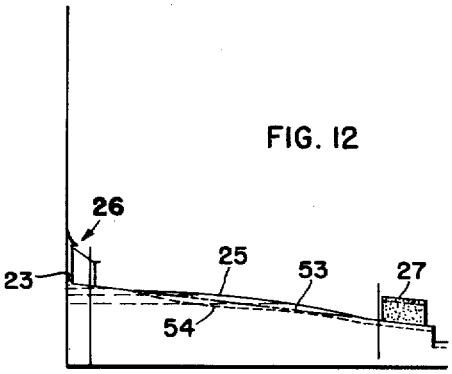
Figure 15:
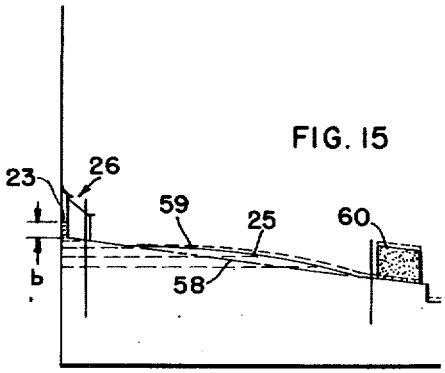

Figures 10 to 15 are further diagrams of the roof according to Figure 1, in views generally similar to Figure 9 but on a smaller scale to allow them to be placed on one sheet for convenient comparison. In Figure 10 we show the roof as initially built. In Figure 11 part of the tank has been filled with liquid and parts of the roof begin to float. In Figure 12 additional liquid has been added and additional parts of the roof begin to float. In Figure 13 the entire roof is floating. Figure 14 shows the effect of a heavy rainfall. Figure 15 shows the effect of a permanent increase in the central ballast weight. In each of these six figures vertical dimensions are greatly exaggerated—partly more so than in Figure 9—in order to emphasize the different contours of the roof in the different conditions.

Figure 16:
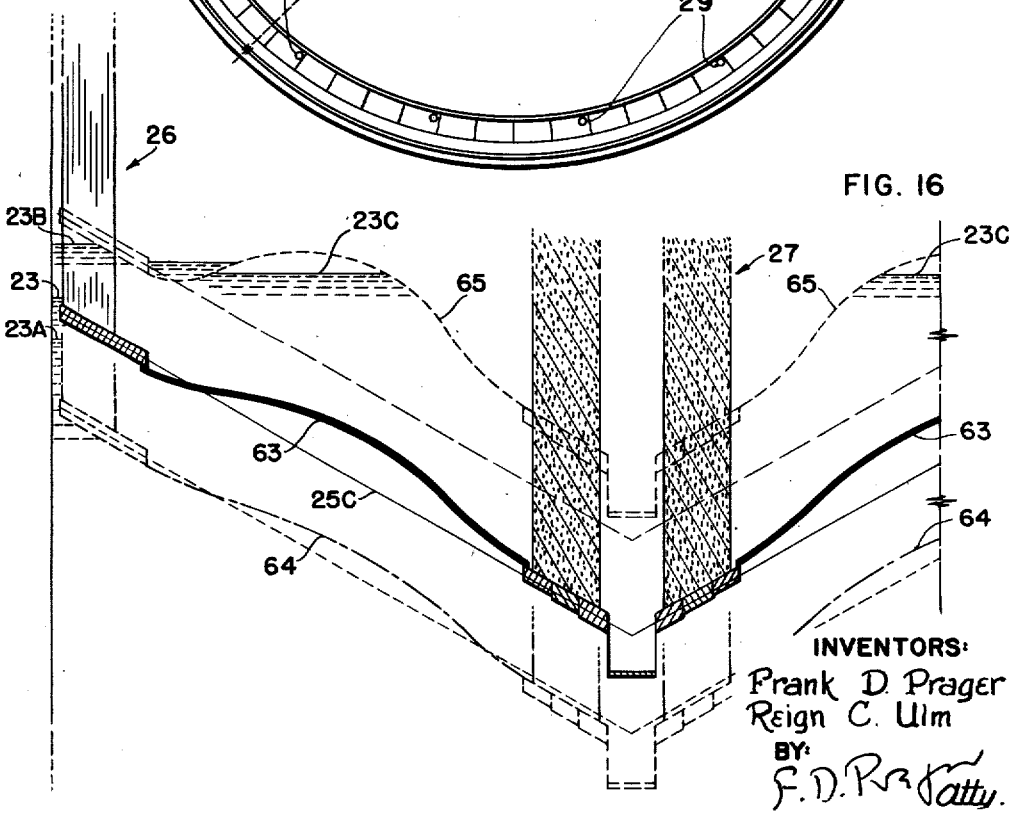
Figure 5:
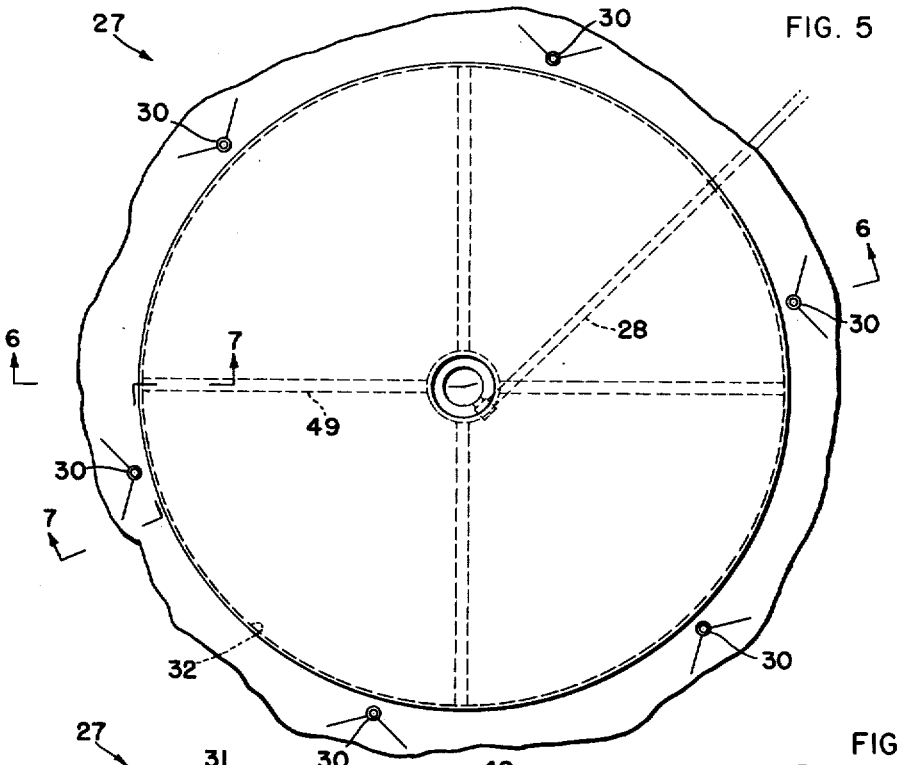

Figure 16 is a final diagram, illustrating three different conditions of such a roof. At the bottom of the figure we show the operative conditions of Figures 13 and 14 with added emphasis on the vertical dimension but substantially without such distortions as are required and used in Figures 10 to 15; thereby disclosing the true character of the normal, operative contours of our floating roof, on the basis of an exhaustive analysis thereof. At the top of this last figure we show a condition of the roof that would result from changes applied to certain critical, dimensional and numerical relationships, wherein the roof flexes in a manner such as to promote accumulations of water and vapor, and local strains; this is a condition that is prevented by our invention and particularly by compliance with the critical numerical relationships that will be explained herein.

We provide a floating roof tank 20, formed by the conventional, circular bottom 21 and cylindrical shell 22. The volatile liquid or product 23, often a sour crude, is admitted and withdrawn through conventional openings and conduits, not shown. The roof 24 floats on the surface of the product, keeping it substantially covered and protected from contact with the atmosphere and from the influence of the wind, thereby greatly reducing the tendency towards evaporation.

The present roof is a single-deck floating roof of the so-called pan type, formed by the single, thin, substantially flat deck 25, the rim portion 26 disposed along and upstanding from the peripheral part of this single deck, and, as a novel feature, the ballast weight 27 in the central part of the roof.

A drain, comprising for instance the conventional swing-pipe assembly 28, is connected to the center of the roof, for the purpose of removing rainwater from the entire surface of the roof. The removal of rainwater is important because the roof would sink if no such provision were made. Furthermore it is important that such removal be complete, rapid, automatic, and uniform over the entire surface of the roof. This will be fully understood when it is considered that rain, combined with wind and other factors, tends to deposit soot, leaves and various other impurities on the large area of such a roof; that such deposits lead to prolonged retention of humidity and to very bad forms of corrosion; and that such deposits cannot be easily removed except when keeping the surface of the roof as smooth, unobstructed, and inclined as may be possible, and compatible with economy in the numerous other respects to be kept in mind. When referring to rainwater, in this specification, we include the impurities referred to; also the water derived from melting snow or ice, and the flushing water that may be used, occasionally, to remove deposits of soot and the like.

For the support of the roof during maintenance operations on its underside, when the tank is drained, we provide, for instance, support legs 29 of a design that is known by itself. We locate these legs, equally spaced from one another, along the rim portion 26; at least this is our preferred arrangement for these legs, which is made possible by the central weight and the structural design principles combined therewith, as will be explained presently. We may add similar legs 30, equally spaced from one another, around and adjacent the central weight 27. We prefer not to distribute such legs over the single deck 25.

In the preferred form of our invention the central weight 27 comprises a body of loose material 31, supported by and above the central part of the roof, and a cylindrical wall 32 upstanding from and secured to the deck, to surround and retain this body of loose material. This wall 32 inherently reenforces the central part of the roof, but no such walls or reenforcements are distributed over the deck 25. Complete watertightness is not necessarily required for the seam between wall 32 and deck 25; on the contrary it is desirable to allow the products of atmospheric condensation, which tend to form in the body of loose material, to drain away. A cover 33 is preferably installed above the body of loose material, in order to avoid losses thereof incident to maintenance operations on the central drain 28 and other parts of the roof. A narrow flange 34 may be provided, depending from the cover and engaging the wall 32. This arrangement enables maintenance men to walk on the central ballast weight. None of the loose material will be lost; the cover is prevented from shifting; and it is possible, in case of need, to remove the cover without major operations such as flamecutting of steel, in order to increase or decrease the amount of loose material forming the weight. Changes or adjustments of this amount may be necessary, for instance, when a product of different type and specific weight is stored in the tank, or when structural changes are made on peripheral seals or the like.

The bottom supporting the weight 27, in other words the central portion of the roof, is identified by numeral 35. It is formed by concentric rings of plate material 36, 37, 38 and 39, of substantial thickness as compared with the flexible deck 25, both in order to safely provide against destructive corrosion of these important parts and for other reasons to be explained in due course. The weight of these heavy plates of course contributes to the central ballast weight and to the structural and functional results attained thereby.

The single deck 25, which is secured to the edge of the central portion 35, is generally fabricated from steel, although various other materials may be used. We prefer a thin, light and relatively inexpensive material such as steel plate or sheet having a uniform thickness, desirable about $\frac{3}{16}$ of an inch, throughout the area of the deck 25. Such uniformity of thickness, and the absence of support legs and structural reenforcements distributed over the deck 25, reduces the cost of our roof considerably, since the layout, fabrication and maintenance of this deck—the largest and most important part of the roof—is greatly simplified. A thin and light material is also preferred for the deck 25 because this tends to reduce the total weight of the roof, thereby reducing the cost of material for the roof and the loss in storage capacity of the tank. Finally the flexibility provided by such a thin sheet is basically required in order to allow our central ballast weight to control the contour of the roof throughout the area thereof. The thickness of $\frac{3}{16}$ of an inch is the approximate minimum that we presently contemplate for steel plate or sheet in roof or deck 25. Plate or sheet of other material may have to be slightly heavier or at least thicker. These statements pertain to large floating roofs, wherein such a minimum thickness as $\frac{3}{16}$ of an inch is structurally required; they also pertain to floating roofs of different sizes where such minimum thickness is at least functionally required in order to guard against the atmospheric corrosion that tends to occur even when the attack of accumulated water and gas is eliminated.

It is well known to persons skilled in this art that steel sheet of $\frac{3}{16}$ of an inch thickness is extremely flexible, when disposed at the bottom of a pan type floating roof; if not held or tensioned in some manner it actually follows any wave actions of the liquid level, almost like a large and thin leaf. It is pertinent at this point to note some basic differences between single-deck and other floating roofs. The so-called double-deck floating roofs have a lower deck, in contact with the product at all times, an upper deck, absorbing the sun's rays, and an intermediate, hollow space, generally filled with air, whereby the product is insulated from the heat transmitted to the upper deck. This provides maximum, if not complete conservation of the gasoline values that tend to escape in form of vapor; the effect of heat like that of wind is practically eliminated. However, double decks are expensive; more so, in many cases, than is justified by the added savings. This is the basic justification for single-deck floating roofs, whereby the effect of wind is practically eliminated but that of heat is not, or at least not as completely as with double-deck roofs. Obviously it is imperative to keep the saving in cost, provided by single decks, at a maximum. It is mainly for this reason that we use the thinnest material compatible with good engineering practice, for the deck 25, and that we place importance on all means to reduce the cost of this deck and to lengthen its useful service life.

The use of a ballast weight on a floating roof may appear paradoxical, as indeed the idea of any ballast weight is somewhat paradoxical. It is generally true that every ton of weight added to a floating roof means a ton less, in the storage capacity of the tank; subject however to several corrections and modifications since the ballast weight will generally have much greater specific gravity than the product, and since the total storage capacity is favorably affected by every reduction in the need for maintenance operations. Also the overall economy of a floating roof tank depends on the service life and maintenance cost of the roof along with the first cost of the roof and the value of the product stored and protected from evaporation. Practically all of these factors are in favor of the features disclosed herein, for single-deck floating roofs.

The loose material of our central ballast weight 27 is preferably sand, although we may use instead, water, clay, dirt, gravel and other loose materials; also solid materials such as concrete. A given weight of sand requires less space and enclosing structure than does the same weight when formed of water, and only slightly more than dirt or concrete. Water is somewhat easier to handle than sand, and much easier than dirt or concrete, during the construction of the ballast weight; however it has certain disadvantages. It is so loose as to shift and rock upon the slightest provocation, when the roof is exposed to vibrations by wind or the like. For this reason, and for the purpose of providing safe access to the central drain, water requires somewhat more expensive cover structures than does a body of sand. Water also tends to evaporate, in the hot climate that is typical for the locations of many storage tanks of this type; thus requiring constant attention if the central ballast weight shall be maintained. As a substitute for sand, a clean and homogeneous type of clay will often be suitable for our purposes; sometimes it will even be better, due to its higher specific weight. Almost invariably it is easy and quite inexpensive to provide a suitable material for our central ballast weight, at typical locations for floating roof tanks. No reenforcements are generally required in the body of a ballast weight of concrete if this be used; this type of weight will also eliminate the need for a cover and sometimes the need for a retaining wall.

Ballast weights are, of course, well known to many arts. Specific ballast weights have been used on roofs of the breather type, in gasoline-vapor storage tanks, in order to dampen the breathing movements, which tend to produce snap action in portions of the roof, due to the elastic nature of the vapors and gases stored in such tanks. We do not store vapors and gases; in fact we have discovered, on the contrary, a new and specific type of ballast weight that aids in eliminating these materials.

In the art of floating roofs, where the deck is required to be in contact with an inelastic liquid, it has not to our knowledge occurred to anybody as yet to use a central ballast weight of such magnitude and form as explained herein. Indeed no ballast weights are required by double deck roofs. Single deck roofs, in our opinion, are greatly benefited by the features of this invention.

Sometimes it has been proposed that the entire surface of a conventional single deck floating roof be covered with a layer of sand, to the depth of approximately five or six inches, to keep rain water from unbalancing the roof, to keep the product cool, and to counteract fires. It has also been proposed, for similar purposes, that rain water be intercepted in small compartments formed on the roof and distributed over its surface, before such water is drained off. These proposals, which we discovered upon a detailed investigation of our own invention, aim at results different from ours, and lead to different structural and functional conditions.

A basic function of our ballast weight 27 is, to keep the flexible deck in a certain inclination and contour. The very existence of a sand cover or system of water compartments over the area of the deck eliminates the flexibility that we provide.

The sheet material used in our deck 25 tends to curve downwards, slightly, when suspended in air, but to curve upward when exposed to a considerable upward pressure of liquid under the pan-type roof. In some locations on the roof and under some conditions such liquid pressure may exist but may only reduce and not reverse the basic, downward curvature; this is true mainly at points which are but slightly immersed, and which are close to points of rigid attachment.

When the upward flexing exceeds certain limits, locally or otherwise, it is objectionable. [It will then produce accumulations of vapor and gas under the roof, and sometimes also accumulations of water on the roof, and undesirable stress concentrations in parts which are supposedly light and flexible.] Our ballast weight 27 has the important function of permanently keeping the upward flexing of deck 25 within small and unobjectionable limits.

A further function of this weight is that it maintains a certain type and degree of inclination throughout the flexible deck 25. Somewhat similar results have been previously obtained, in this respect, by systems of structural members installed above or below a single deck floating roof. However, our device, using a deck 25, unreinforced and unobstructed throughout the upper and lower surfaces thereof, is more efficient, and either more economical or at least not more expensive. The structural trusses of prior art floating roofs form bothersome obstructions, making it hard to walk over the surface of the roof. They also cause irregularities of this surface since the deck tends to curve upwards between points or lines of attachment of structural members, mainly in the low-lying central parts. Only partial success is obtainable with those structures, in the prevention of corrosive accumulations; and that only with difficult and expensive adjustments of tension rods and the like.

It has occurred to us that all these difficulties can be avoided with a central ballast weight of a magnitude sufficient to equal the forces transmitted to a deck by the structural systems of the prior art, and that this magnitude of the weight can be kept quite moderate. On detailed investigation we found this idea fully confirmed.

It was probable to us from the start, and again was confirmed by investigation, that certain critical values or ranges of values must be considered, with respect to dimensions of the ballast weight and other parts if the functional and structural conditions generally described above are to be realized. This can be explained conveniently by reference to a specific example.

Figure 4:
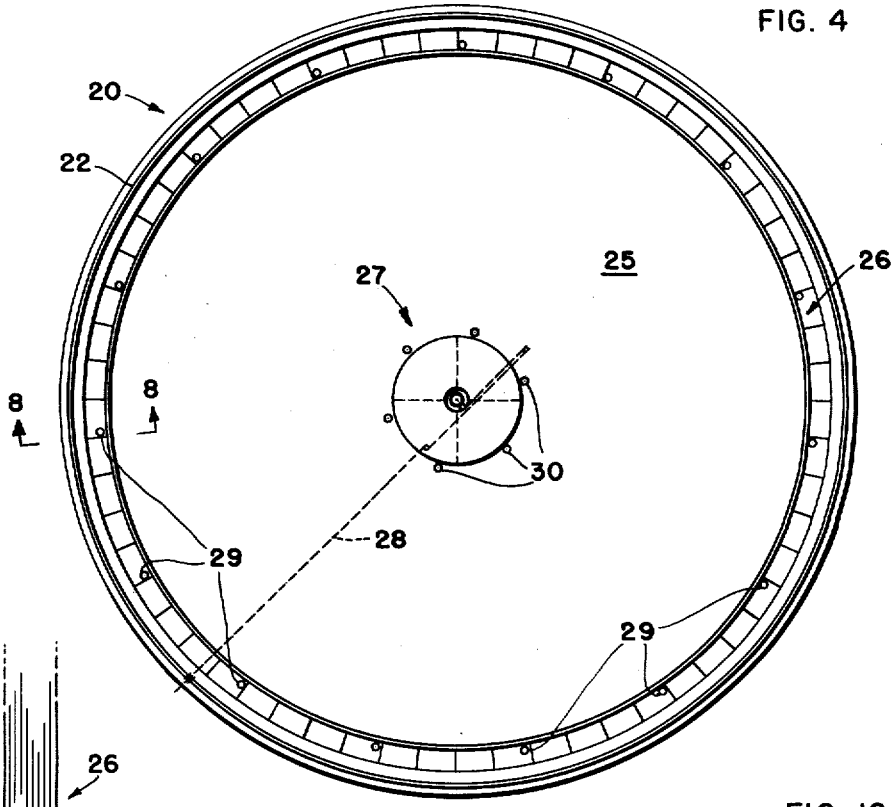

For this purpose we shall refer to a typical floating roof tank 20 with a diameter of 120 feet. The height of the shell 22 may be about 40 feet, as usual. The diameter of the floating roof is about 119 feet. Figures 1 and 4 are based on such proportions.

The total weight of our roof 24 is about 75 to 100 tons when using the aforesaid $\frac{3}{16}$ inch steel plate for the deck 25, providing a sufficiently rigid rim 26, and central weight and supports thereof; also including in the total weight all accessories such as support legs 29 which are normally required according to conventional principles well established in this art. Not included in the total weight mentioned is any rain water, any sand spread out over the entire area, and other unconventional weight elements. The concept of the total weight that is defined by these inclusions and exclusions will be used throughout this disclosure and in our claims.

A typical ballast weight for the roof under discussion weighs about 20 tons; that is, 20 to 27 per cent of said total weight of the roof. In roofs of different size and slightly different type it will amount to a slightly different percentage of the total weight; generally about 15 to 30 percent of it.

A typical pan type roof of the prior art, of equal size and service, has a total weight of about 70 to 80 tons; considerable portions of that weight being accounted for by structural reenforcements distributed over the deck. Our roof is somewhat heavier in its entirety, and mainly at the center and periphery. It is lighter over the intermediate area.

When covered with sand according to the proposals that have been mentioned, a prior art roof of the type mentioned has a total weight that we consider prohibitive. 6 inches of sand placed over the entire surface would more than double the weight of 80 tons. Additional reenforcements would then be necessary, and would add further to the weight. Nevertheless this entire, heavy cover of sand would have none of the results and advantages provided by our centrally located ballast—desirable as it may be in other respects.

Our ballast weight 27 is located in a centrally and concentrically disposed, low-lying part of our roof. We have found it most desirable to locate the bottom of our weight about 7 to 14 inches below the bottom of the rim 26, thus providing an average slope of about 1 to 2 per cent. The actual slope varies, as will be explained. It will also be seen, presently, that the height of the weight exceeds said 7 to 14 inches which are the height of the inclined deck.

We have found it most desirable to connect our ballast weight 27 to the flexible deck plate 25 along a circle of about 20 to 25 feet diameter. When sand is used for the ballast it may form a cylindrical body having a diameter of about 18 feet and a height of about 1½ feet.

The net force derived from our ballast weight after deduction of the hydraulic uplift, and applied on the flexible deck 25 to keep this deck immersed and uniformly curved, imposes a substantial stress. The stress is also a function of the inclination of the deck which as mentioned is 1 to 2 per cent as an average. Steeper inclinations reduce the stress, just like the slackening of a sail reduces the stress on the ropes. In order to distribute the stress over a sufficient amount of steel in our flexible deck we use an inner diameter of deck 25, and outer diameter of plate 36, amounting to about 25 feet, providing about 175 square inches cross-sectional area of the $\frac{3}{16}$ inch plate. The applied load may sometimes exceed 1000 tons.

Thus a ballast weight with a substantial diameter such as 18 feet is quite desirable. This enables us to limit the height of this weight to the low figure of about 1½ feet, thereby preventing the weight from intercepting the wind, and also keeping the access to the central drain easy. Thus we prefer a ballast weight formed by a body of heavy material (such as sand, being more than twice as heavy as the typical product); said body being permanently located on the roof, concentrically therewith, having considerably greater horizontal extension than height, but being limited to a central part of the roof and surrounded by the flexible deck 25, which forms a major, annular part of the roof, as most clearly shown in Fig. 4.

The rings of steel plate supporting the weight will add one or several tons to the 20 tons of the ballast weight itself, depending on the thickness of such rings. We provide rings for this ballast weight support which have increasing thickness, in inward succession, proportioned to the inwardly increasing strees. For the roof under consideration, typical thicknesses are: ⅜ of an inch for the outermost ring 36; ½ inch for the next ring 37; ⅝ of an inch for the second-last, 38; and ¾ of an inch for the innermost one, 39; providing a weight of the ballast weight support which may be up to 5 tons if each ring is about 3 feet wide. It will be seen that the ballast weight is heavier than the underlying support rings, and that it forms a very substantial part of the total weight of the roof, although the support rings themselves are preferably quite rigid and therefore rather heavy. If our weight 27 were placed in the center of an ordinary floating roof the deck would be ruptured and the roof would sink. Equally, if the critical dimensions of the weight and its support were not complied with, and the load of about 1000 tons applied, for instance to only 50 square inches of steel, the deck would fail in due course.

The stress existing in the central part of the flexible deck can be calculated according to the following formula, which has been developed for this type of floating roof:

$$T_a = \frac{WR}{2\pi tah} \tag{1}$$

In this expression the following symbols are used:

a—the inside radius of the flexible deck 25, where it is attached to the heavier plate 36, in inches
h—the depth of the roof; the difference in elevation between the bottom of the rim portion 26 at the periphery, and the bottom of the weight 27 adjacent the center, in inches
R—the radius of the roof, in inches
t—the thickness of deck 25, in inches
$T_a$—the stress existing at the outer end of "a," in pounds per square inch
W—the magnitude of the central ballast weight, in pounds.

Of course this formula can be used to solve for W, for "a," or for "h" if the other values are given, or limited by standard practices. It is believed to be unnecessary herein to present the derivation of the formula; the pertinent calculations are known to persons skilled in this art. Equally such persons will be able to supply similar stress formulas for locations other than "a." Important among them is the formula for the rim portion 26. The usual stress analysis shows that exceptionally high stresses are encountered in this portion.

Further analysis clears up the behavior of the roof plates 25 at various locations between the rim and the weight, with respect to the flexure of such plates. The analysis is not simple, since the various stresses are accompanied by small but definite amounts of stretch, and other complications are encountered. What we require as to the flexure of the deck is that the deflection from a certain datum line or plane should not exceed certain values, in order to avoid strains leading to fatigue, and that all portions of the flexible deck have upward and outward inclination, so that water falling onto the roof may readily, completely and uniformly flow to the central drain and that vapors and gases released under the roof will flow with equal readiness, completeness and uniformity to the periphery of the roof. This inclination cannot be the same at all locations of the roof, just like the curvature of a sail is not the same everywhere. The flexible deck forms a solid of rotation, around the center of the roof, having some similarity with an inverted cone but not being identical therewith.

During construction, when each plate of the flexible deck is supported in some manner, the deck may have a shape that is practically identical with such an inverted cone. As soon as the supports are removed and the deck is suspended from the legs 29 and 30, it sags down to a slight extent, and when floating it bulges up, to different extents at different points. It still forms a true solid of rotation, thereby distinguishing from the structurally reenforced decks with local bulges and depressions.

It remains to explain this solid of rotation in greater detail and thereby to clarify additional relationships between values such as a, h and others. The following additional values must be considered:

b—the height of the product above the bottom of the rim 26, in inches
r—the radial distance from the center, in inches
w—the unit hydrostatic pressure, in pounds per square inch
w'—the unit weight of the deck plate, in pounds per square inch; and finally,
Z—the flexure of the deck, generally above the datum plane of the inverted cone as originally constructed, in inches.

Also required, for a quantitative solution, are certain integrating factors $C_1$ and $C_2$, separately calculated from the values listed according to principles which need not be stated in detail.

Our basic requirement for the deck can be expressed by the formula:

$$Z < h\left(1 - \frac{r}{R}\right) \tag{2}$$

The actual values of Z existing at each point can be computed from the formula:

$$Z = \frac{r^3\left(2w(h+b) - wh\frac{r}{R} - 2w'\right)}{12taT_a} + C_1 r + C_2 \tag{3}$$

When actually computing values of Z for the present roof, with a slope "h" between 7 and 14 inches, with a minimum or zero value for "b," and a central stress $T_a$ as per Formula 1 we find:

| Flexure | At a radial distance from the center, r |
|---|---|
| | Inches |
| .71" | 200 |
| 1.55" | 300 |
| 1.77" | 400 |
| 1.34" | 500 |
| .63" | 600 |
| .04" | 700 |

These values, when plotted, show the actual contour of our roof. Some of them are shown in Figure 9. Here, the symbols $Z_{r1}$, $Z_{r2}$ etc. signify the deflection at locations r1, r2 etc. It will be seen that the roof has general upward, outward slope, according to Formula 2.

Figure 2:
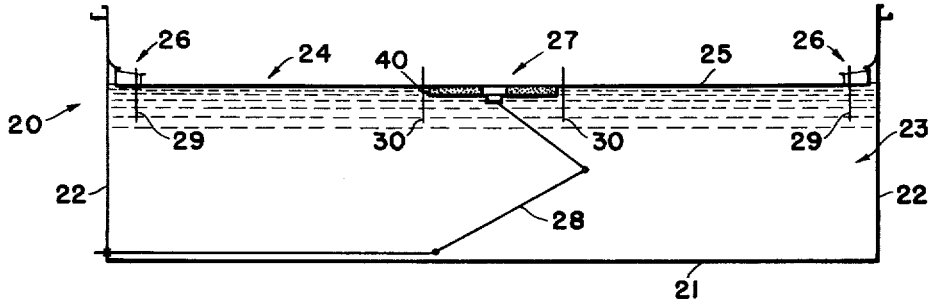

In connection with these stress and flexure considerations it is pertinent to refer to the modified form of Figure 2. Here the central weight is suspended from the deck by a depending wall 40, instead of being supported on the deck. This has the advantage of presenting a deck surface from which even the upstanding weight is eliminated, for perfect drainage. The structural support of the weight is more complicated in this event and the details of plates 36, 37 etc. must be modified considerably, in a manner that will be evident and need not be shown in detail. If this is done the Formulas 1, 2 and 3 apply unchanged.

Figure 8:
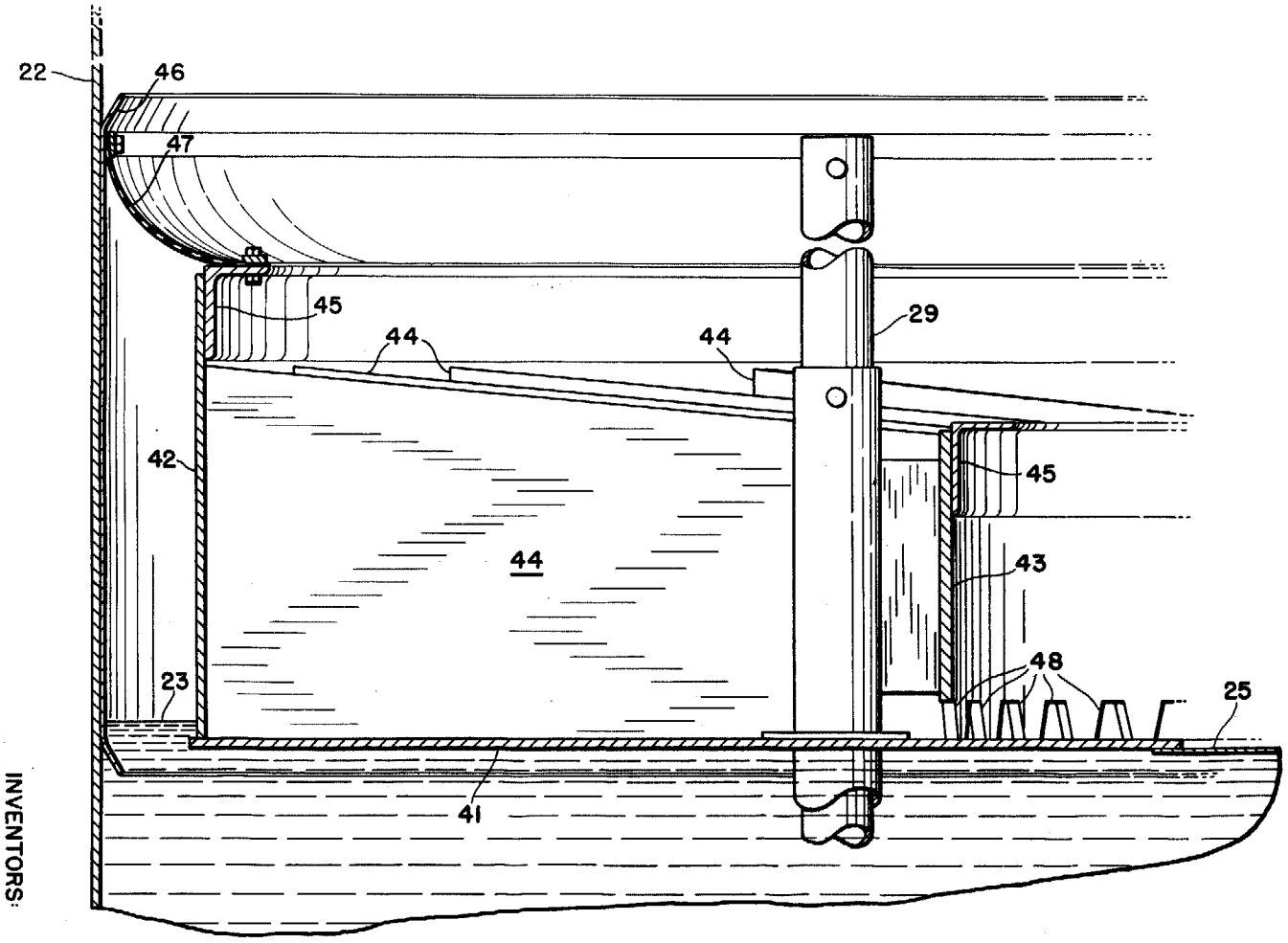
Figure 8 is a sectional elevation, on the same scale as used for Figure 7, of plate and other details in outer parts of the roof; the section being taken along lines 8—8 in Figure 4. Again certain differences in metal thickness are shown.

Reference will now be made to Figure 8, wherein we show the preferred form of our rim portion 26. The entire rim must be made very heavy and rigid, as compared with the flexible deck 25 and the rim extends entirely above the deck 25. The bottom of this rim portion, formed by the outermost, annular plate 41, is secured to the peripheral part of the single deck 25. In a roof as mentioned it is about ½" thick. It is reenforced by the upstanding, annular rim plate 42, which is also required to retain the hydrostatic head "b" of any product 23 around the pan type roof. The rim plate is located along the periphery of the roof, and is about ¾ of an inch thick. Further reinforcement is required in the present instance, as distinguished from ordinary pan type roofs; it is provided by an inner, annular rim plate 43, concentric with 42 but spaced from 42 by several feet; also about ¾ of an inch thick. Moreover a series of gussets 44 is needed, about ⅜ of an inch thick, radially interconnecting the rings 42 and 43. It will be noted that the reinforcements 43 and 44 are shown as being located directly above the top of the outermost deck plate 41; in other words, the rim plate 42 is made rigid at least adjacent the deck. Preferably, final reenforcement is provided by structural angles 45 at the top of members 42, 43 and 44.

This unusually rigid structure is provided in our rim portion 26 in lieu of truss members over the deck 25, which we eliminate. The rim is put into compression by the uplift of the liquid as modified by the weight of the deck and ballast. Rigidity of the rim is also required for the proper support of the conventional seal shoes 46 and seal fabric 47; but this conventional requirement is less exacting than the requirements resulting from the novel stress conditions in our roof. By means of this arrangement we are also enabled to support practically the entire weight of the roof, during repair work, on legs 29. These legs are preferably installed between the rim plates 42 and 43, adjacent gusset plates 44, to which they are secured. This is one of the important expedients used herein to eliminate irregularities from the contour of the flexible deck 25.

In order that rain water may not accumulate between the rim plates 42 and 43 the inner rim plates 43 are perforated by openings 48, allowing such water to drain onto the flexible deck. Complete drainage is facilitated by the feature that the deck 25 is lapwelded to the underside of plate 41 but to the top of plate 36. For the same reason the heavy rings 36, 37, 38 and 39 are buttwelded together with their upper edges flush with one another.

Figure 6:
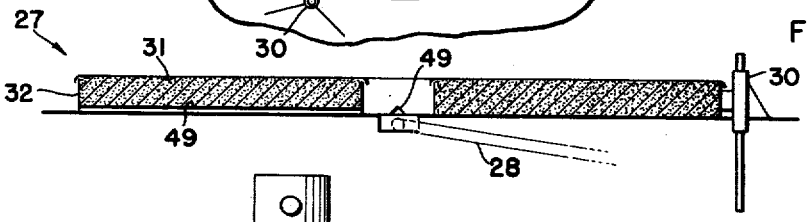
Figure 7:
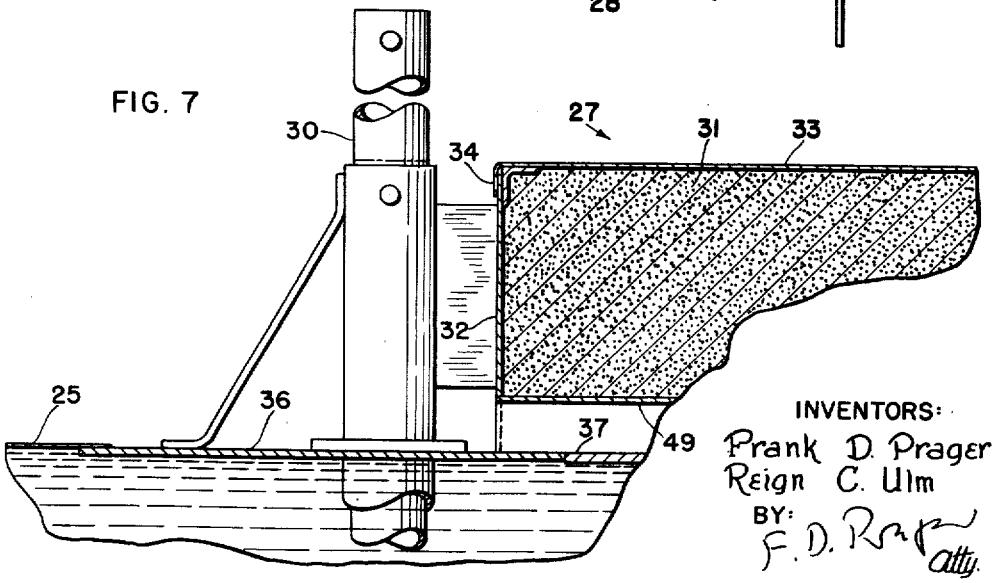

Returning once more to Figures 6 and 7 we have shown drain passages leading through the bottom part of the weight 27, formed by inverted V-shaped plate structures 49 secured to the surface of the central deck plates 36, 37, etc., below the weight material 31; these passages establishing communication between the central drain 28 and the entire space above the roof.

The operation of our device is understood most readily by reference to Figures 10 to 15.

In Figure 10 we show the roof supported by the legs 29 and 30, after completion of the original construction and removal of auxiliary supports used during such construction. Numeral 50 designates a conical plane such as that according to which the roof has been constructed. The roof has now sagged down, with a certain stretch; the amount of vertical sagging being, of course, greatly exaggerated in the drawing.

When liquid is introduced below the roof, slowly enough to avoid inflation by compression of air, the underside of the roof begins to float first at the deepest point of curve 50. This curve is shown in Figure 11 at 52, while numeral 51 designates the original cone shape of the roof.

Figure 12 shows the condition upon further filling. The original cone is shown at 53; the entire deck 25 is now above it. The previous form is shown at 54, for easier comparison. The ballast weight has been lifted off from its supports 30, being most deeply immersed. The peripheral, heavy rim 26 is still supported on its legs 29. The sequence in which the various parts of the deck lift off from the ground will be slightly different if the filling of the tank takes place during a downpour of rain.

Finally the entire roof will float, as shown in Figure 13. Here the original cone, now lifted off with the roof, appears at 55. The deck 25 is in the same shape as in the previous figure, only floating at a higher elevation.

The normal condition of the roof, shown in Figure 13, undergoes several changes during heavy rainfalls, when water is precipitated onto the deck more rapidly than it can drain away through the piping 28. A sudden shower may precipitate a substantial depth of water on the deck. A precipitation of 1 inch height, over the circular area of 120 feet diameter, amounts to almost 30 tons of water. A portion of such an amount may be temporarily present on the deck; for instance, up to 25 tons. As a first and elementary result, the roof sinks more deeply into the product, leading to an increase in the value "b," by a fraction of an inch, or in extreme cases a whole inch or slightly more. Due to the relationships expressed by Formula 3, the values of Z are changed. They are also changed, in fact to a larger extent, by the resulting change in the central stress $T_a$. The upward flexure of the deck 25 over the original cone is reduced, as will appear from examination of Figure 14, showing this condition, wherein the original cone appears at 56 and the previous, more normal contour at 57.

If we compare the structural changes taking place in our roof during a rainstorm with those that would take place in a conventional pan type roof with compartments to intercept the rain water in distributed relation, draining it off slowly, we find that we have a lesser increase in immersion "b," but mainly a lesser increase in central stress $T_a$, due to the compensating effect of the permanently installed weight 27. Due to the smaller increase in stress $T_a$ we have less of a change in flexure; that is, more controlled and stabilized conditions. Our roof will also drain more rapidly.

A somewhat similar comparison is allowed by Figure 15, showing a central weight 60 enlarged in height and magnitude. No. 25 shows the contour of the roof; 59 the contour according to Figure 14. The total immersion "b" may be the same in both cases (Figs. 14 and 15) but the contour or flexure changes because of the different geometrical locations of the weights of sand and water, loading the roof. The original cone appears at 58.

Figure 3:
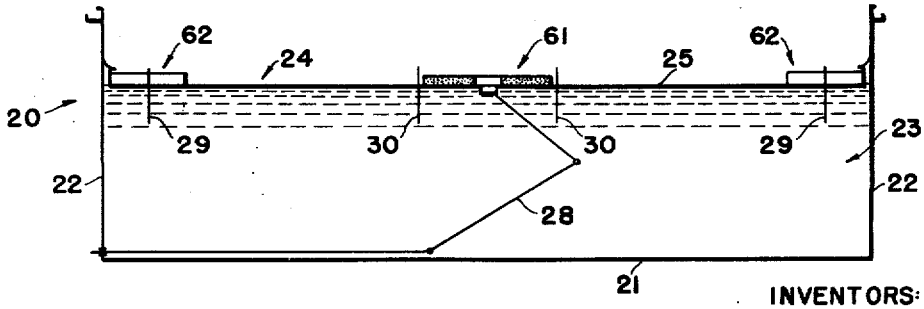

In some instances a load may accumulate on a roof that cannot be drained off; for instance due to snow. At locations where the floating roof is to be operated during the wintertime, and where heavy snowfall is to be expected, we may resort to the device shown in Figure 3. This shows a single deck floating roof of the so-called annular pontoon type, equipped with a central weight 61 that may be somewhat smaller than in Fig. 1, due to the smaller area of the flexible deck, and with an annular pontoon 62. This pontoon will keep the roof floating even if large amounts of water, snow, slush or ice accumulate. Structurally, it acts in the same manner as does our rim portion 26, which is open on top and generally smaller in horizontal extension for reasons of economy.

Finally, reference may be made to Figure 16. Here, the operative conditions of Figures 13 and 14 are compared on a larger scale and with less distortion than in said figures, at 63 and 64 respectively. The curvature 63, as shown in this figure, represents the typical values of flexure Z as listed above. The original cone shape is compared with the curvature 63 at 25–C. The inclination of the curve 63 is upward and outward everywhere, although it changes in detail, being flatter in outer parts than in the center. This general upward and outward inclination is also present during the exceptional, operative condition shown at 64; in fact it is improved and more uniform under this condition.

Under other circumstances this desirable inclination would not be maintained; for instance if the weight of the central ballast were seriously depleted below the critical value that has been defined. Such a condition is represented by curve 65. The center of the roof would rise, much more than the roof in its entirely. Fullness would develop, at one point or another, in the flexible deck 25. As a result, pockets would form, as shown, tending to retain accumulations of corrosive matter.

Still further rising of the center is allowed in the so-called breathing types of floating roofs, while the controlled conditions shown at 63 and 64 are never obtained in those roofs. Most frequently, conditions such as that exemplified by curve 65 prevail in such roofs. It will be noted that such conditions differ in several respects from those that we maintain by means of our ballast weight. Our weight is heavy enough with respect to the weight and immersion of the deck and the other predetermined factors, calculated according to the formulas given, to hold the flexing of the roof within close limits as exemplified by curves 63 and 64. At and between these limits the actual contour of the roof, while being curved in the approximate manner as shown, is located adjacent the side of the inverted cone 25–C according to which the deck has been fabricated originally; in the condition of curve 65 the contour of the roof diverges from this side, mainly in the central part. In our operative conditions 63 and 64 the central part of the roof remains below the base plane of said original cone, being allowed merely to rise by a small, predetermined amount Z which can be calculated for the central part, and being actually depressed below such position according to curve 64. As will be noted from Figure 16, substantially the entire surface of the deck has a curved contour in vertical plane, shown at 63 or 64, with a slope upward and outward from the generally central part supporting the ballast weight means. In the condition of curve 65, central and intermediate parts of the roof approach, reach and pass the base plane, with resulting reversal of the cone, bulging, strains, and corrosive accumulations. In our operative conditions 63 and 64 the product 23 has contact with the entire underside of the roof and only an annular ring of the product, of narrow width, has a vapor-releasing surface exposed to air as shown at 23 for curve 63 and at 23—A for curve 64; even this narrow surface is localized so that the contacting metal plates—the inside of the tank and the outside of the rim—can be painted and reconditioned without extreme difficulty. In condition 65, more than the peripheral product level 23—B is exposed; bulges are formed, as shown, whereunder vapor-releasing pockets of product 23—C are retained.

We claim:

[1. In liquid storage apparatus, a substantially centrally drained floating roof having the entire under side immersed in the stored liquid and the deck portion thereof shaped by contour-controlling ballast weight means, comprising an outer, upstanding, rigid, compression-resisting rim; a single flexible, intermediate deck, being unreinforced and unobstructed substantially throughout the top and under side thereof, and having its outer part secured to the bottom part of the outer rim, said rim being reinforced at least in said bottom part to which the outer part of the deck is secured; and ballast weight means limited to and substantially distributed over a generally central, minor but substantial part of the area of the floating roof, and constituting a sufficient part of the total weight of the floating roof for the purpose of immersing the entire under side of the roof in the stored liquid and cooperating with the stored liquid in giving substantially the entire surface of the deck a curved contour in vertical plane, with a slope upward and outward from said generally central part; said single flexible deck comprising the major part of the area of the floating roof and substantially the entire area of the floating roof between said generally central part and the rigid rim.]

[2. In liquid storage apparatus, a substantially centrally drained floating roof having the entire under side immersed in the stored liquid and the deck portion thereof shaped by contour-controlling ballast weight means installed in a generally central, minor but substantial part of the area of the floating roof; comprising an outer upstanding, rigid, compression-resisting rim; a single flexible, intermediate deck, slightly inclined inwardly for drainage, being unreinforced and unobstructed substantially throughout the top and underside thereof, having its outer part secured to the bottom part of the outer rim, said rim being reinforced at least in said bottom part to which the outer part of the deck is secured, and said single flexible deck comprising the major part of the area of the floating roof and substantially the entire area of the floating roof between said generally central part and the rigid rim; and ballast weight means limited to and substantially distributed over said generally central part and constituting about fifteen to thirty per cent of the total weight of the floating roof, for the purpose of immersing the entire under side of the roof in the stored liquid and cooperating with the stored liquid in giving substantially the entire surface of the deck a curved contour in vertical plane, with a slope upward and outward from said generally central part.]

[3. In liquid storage apparatus, a substantially centrally drained floating roof having the entire under side immersed in the stored liquid and the deck portion thereof shaped by contour-controlling ballast weight means installed in a generally central, minor but substantial part of the area of the floating roof; comprising an outer, upstanding, rigid, compression-resisting rim; a single flexible, intermediate deck, slightly inclined inwardly for drainage, being unreinforced and unobstructed substantially throughout the top and underside thereof, having its outer part secured to the bottom part of the outer rim, said rim being reinforced at least in said bottom part to which the outer part of the deck is secured, and said single flexible deck comprising the major part of the area of the floating roof and substantially the entire area of the floating roof between said generally central part and the rigid rim; and ballast weight means limited to said generally central part and distributed thereover, having substantially greater horizontal than vertical extension, and constituting a substantial part of the total weight of the floating roof, sufficient for the purpose of immersing the entire under side of the roof in the stored liquid and cooperating with the stored liquid in giving substantially the entire surface of the deck a curved contour in vertical plane, with a slope upward and outward from said generally central part.]

[4. In apparatus for the storage of volatile liquid a centrally drained single deck floating roof of the type having permanent, direct contact between the liquid and the entire lower surface of the roof, which comprises a single, thin, substantially flat and circular deck, a major, annular, concentric part of said deck being unreinforced and unobstructed throughout the upper and lower surfaces thereof; a rigid annular rim secured to the peripheral part of the deck and extending entirely above the same; an annular wall extending along and secured to the entire extension of the inner edge of said annular part of the deck, said wall surrounding a minor but substantial portion of the deck; and a body of loose ballast weight material permanently installed within, limited to and substantially distributed throughout the space within said annular wall, said body being heavier than the underlying part of the deck and forming a substantial part of the total weight of the roof.]

[5. Apparatus as described in claim 4, wherein said annular wall extends above the major, annular part of the deck, and which additionally comprises conduits secured to the surface of the deck and extending through said annular wall and ballast weight material; the drain being located substantially centrally of said annular wall, and said conduits providing communication between the drain and the top surface of the roof.]

*6. A single-deck floating roof for liquid storage apparatus, comprising an outer rim structure having an annular bottom part rigid enough to withstand compression imposed thereon by the deck, and parts upstanding from said bottom part; a single deck, occupying the major part of the floating roof area and substantially the entire area from the rim structure to a generally central, minor but substantial part of the floating roof area, the deck having an outer part secured to said bottom part of the rim structure, the surface of the deck having slight, upwardly and outwardly directed slope, from the generally central part substantially to the rim structure, the floating roof being adapted when immersed in the stored liquid to effect and maintain displacement of liquid portions, and substantially the entire top and underside of the deck being unreenforced against the buoyancy due to such displacement, so that the deck is flexible and unobstructed; contour-controlling ballast weight means for the deck, installed in, limited to and substantially distributed over said generally central part of the floating roof area and heavy enough to maintain said slope in the deck surface against said buoyancy; and drain means for the deck, in said generally central part of the floating roof area.*

*7. A single-deck floating roof for liquid storage apparatus comprising an outer, upstanding rim structure rigid and heavy enough to withstand compression imposed thereon by the deck; a thin and light single deck, occupying the major part of the floating roof area and substantially the entire area from the rim structure to a generally central, minor but substantial part of the floating roof area, the deck having an outer part secured to a bottom part of the rim structure, the surface of the deck having slight, upwardly and outwardly directed slope, from the generally central part substantially to the rim structure, the floating roof being adapted when immersed in the stored liquid to effect and maintain displacement of liquid portions, and substantially the entire top and underside of the deck being unreenforced against the buoyancy due to such displacement, so that the deck is flexible and unobstructed; contour-controlling ballast weight means for the deck, installed in, limited to and substantially distributed over said generally central part of the floating roof area and constituting about 15 to 30 percent of the total weight of the floating roof, in order to maintain said slope in the deck surface against said buoyancy; and drain means for the deck, in said generally central part of the floating roof area.*

*8. A single-deck floating roof for liquid storage apparatus, comprising an outer rim structure having an annular bottom part rigid enough to withstand compression imposed thereon by the deck, and an annular part slightly upstanding from said bottom part; a single deck, occupying the major part of the floating roof area and substantially the entire area from the rim structure to a generally central, minor but substantial part of the floating roof area, the deck having an outer part secured to said bottom part of the rim structure, the surface of the deck having slight, upwardly and outwardly directed, outwardly decreasing slope, from the generally central part substantially to the rim structure, the floating roof being adapted when immersed in the stored liquid to effect and maintain displacement of liquid portions, and substantially the entire top and underside of the deck being unreenforced against the buoyancy due to such displacement, so that the deck is flexible and unobstructed; contour-controlling ballast weight means for the deck, having substantially greater horizontal than vertical extension, installed in, limited to and substantially distributed over said generally central part of the floating roof area and heavy enough to maintain said slope in the deck surface against said buoyancy; and drain means for the deck, in said generally central part of the floating roof area.*

*9. A single-deck floating roof for liquid storage apparatus, comprising an outer rim structure having an annular bottom part rigid enough to withstand compression imposed thereon by the deck, and parts upstanding from said bottom part; a single deck, occupying the major part of the floating roof area and substantially the entire area from the rim structure to a generally central, minor but substantial part of the floating roof area, the deck having an outer part secured to said bottom part of the rim structure, the surface of the deck having slight, upwardly and outwardly directed slope, from the generally central part substantially to the rim structure, the floating roof being adapted when*

*immersed in the stored liquid to effect and maintain displacement of liquid portions, and substantially the entire top and underside of the deck being unreenforced against the buoyancy due to such displacement, so that the deck is flexible and unobstructed; wall means disposed substantially around said generally central part of the floating roof area; and loose, contour-controlling ballast weight means for the deck, retained by said wall means, substantially distributed over said generally central part of the floating roof area and heavy enough to maintain said slope in the deck surface against said buoyancy; and drain means for the deck, in said generally central part of the floating roof area.*

*10. Apparatus as described in claim 4, said wall means substantially consisting in an annular structure upstanding from the deck; the apparatus additionally comprising conduits secured to the surface of the deck and extending through said annular structure, below the loose ballast weight means; the drain means being located*

*substantially centrally of said annular structure, and said conduits providing communication between the top surface of the roof and the drain means.*

FRANK D. PRAGER.
REIGN C. ULM.

REFERENCES CITED

The following references are of record in the file of this patent or the original patent:

UNITED STATES PATENTS

| Number | Name | Date |
|---|---|---|
| 1,463,268 | Huff | July 31, 1923 |
| 1,592,244 | Wiggins | July 13, 1926 |
| 1,994,478 | Kueffer | Mar. 19, 1936 |
| 2,056,857 | Inboden | Oct. 6, 1936 |
| 2,071,530 | Howard | Feb. 23, 1937 |
| 2,089,645 | Dickman | Aug. 10, 1937 |
| 2,193,484 | Jones | Mar. 12, 1940 |
| 2,425,771 | Wiggins | Aug. 19, 1947 |
| 2,430,592 | Wiggins | Nov. 11, 1947 |

Certificate of Correction

Reissue No. 23,417

October 16, 1951

FRANK D. PRAGER ET AL.

It is hereby certified that error appears in the printed specification of the above numbered patent requiring correction as follows:

Column 17, line 16, for the claim reference numeral "*4*" read *9* ;

and that the said Letters Patent should be read as corrected above, so that the same may conform to the record of the case in the Patent Office.

Signed and sealed this 15th day of January, A. D. 1952.

[SEAL]

THOMAS F. MURPHY,
*Assistant Commissioner of Patents.*